(12) United States Patent
Schmidt

(10) Patent No.: US 8,967,390 B2
(45) Date of Patent: Mar. 3, 2015

(54) FILTER DEVICE, METHOD FOR ITS OPERATION AND USE THEREOF

(75) Inventor: Elisabeth Schmidt, Freiberg (DE)

(73) Assignee: Siemens Aktiengesellschaft, Munich (DE)

( * ) Notice: Subject to any disclaimer, the term of this patent is extended or adjusted under 35 U.S.C. 154(b) by 370 days.

(21) Appl. No.: 13/469,887

(22) Filed: May 11, 2012

(65) Prior Publication Data
US 2012/0285867 A1    Nov. 15, 2012

(30) Foreign Application Priority Data

May 11, 2011    (EP) .................................... 11165669

(51) Int. Cl.
*C10G 1/00*    (2006.01)
*B01D 33/50*    (2006.01)
(Continued)

(52) U.S. Cl.
CPC .............. *B01D 33/46* (2013.01); *B01D 33/073* (2013.01); *B01D 33/766* (2013.01); *B01D 33/807* (2013.01); *B01D 33/463* (2013.01); *B01D 33/466* (2013.01); *B01D 37/045* (2013.01); *C10G 1/00* (2013.01); *B01D 33/60* (2013.01); *B01D 33/663* (2013.01)
USPC ........... 210/408; 210/348; 208/390; 208/391; 196/46.1

(58) Field of Classification Search
CPC ........ C10G 1/00; B01D 33/073; B01D 33/21; B01D 33/27; B01D 33/463; B01D 33/466; B01D 33/60; B01D 33/76; B01D 33/766; B01D 33/801; B01D 33/807; B01D 37/045

USPC ........... 208/390, 391; 196/46.1; 210/348, 408
See application file for complete search history.

(56) References Cited

U.S. PATENT DOCUMENTS 1,963,616 A    6/1934    Fischer ......................... 210/202
3,542,666 A    11/1970    Simpson ......................... 208/11
(Continued)

FOREIGN PATENT DOCUMENTS

| DE | 2106131 A1 | 8/1971 | ............. B01D 33/10 |
| DE | 102007039453 A1 | 2/2009 | ............... B03D 1/02 |
| EP | 0326939 A2 | 1/1989 | ............. C08B 11/22 |

OTHER PUBLICATIONS

Bottlinger, M., et al., "Steam Pressure Filtration for the Treatment of Limey Soils contaminated with Aliphatic Hydrocarbons", $2^{nd}$ Int. Containment & Remediation Technology Conference, Orlando, Florida, 3 pages, Jun. 2001.
(Continued)

*Primary Examiner* — Renee E Robinson
(74) *Attorney, Agent, or Firm* — King & Spalding L.L.P.

(57) ABSTRACT

A filter device for filtering a suspension includes at least one filter for continuous creation of a filter cake including particles from the suspension, at least one dispensing device configured to apply at least one first wash liquid to the filter cakes, at least one steaming unit configured to steam the filter cake using steam; at least one removal device configured to remove a surface layer of the filter cake facing away from the at least one filter, wherein the filter device is configured to convey the filter cake to the at least one removal device, the at least one dispensing device and the at least one steaming device, and at least one transport device configured to transport the removed surface layer of the filter cake away from the filter device.

16 Claims, 4 Drawing Sheets

(51) Int. Cl.
- *B01D 33/60* (2006.01)
- *B01D 33/76* (2006.01)
- *B01D 37/04* (2006.01)
- *B01D 33/46* (2006.01)
- *B01D 33/073* (2006.01)
- *B01D 33/80* (2006.01)
- *B01D 33/66* (2006.01)

(56) References Cited

U.S. PATENT DOCUMENTS

| | | | |
|---|---|---|---|
| 3,969,247 A | 7/1976 | Emmett, Jr. et al. | 210/68 |
| 4,017,399 A * | 4/1977 | Lopker | 210/408 |
| 4,115,265 A * | 9/1978 | Otte et al. | 210/741 |
| 4,240,897 A | 12/1980 | Clarke | 208/11 LE |
| 4,519,910 A * | 5/1985 | Ragnegard et al. | 210/327 |
| 4,521,314 A | 6/1985 | Lundin et al. | 210/777 |
| 4,695,381 A * | 9/1987 | Ragnegard | 210/403 |
| 4,954,268 A | 9/1990 | Just et al. | 210/772 |
| 4,968,412 A | 11/1990 | Guymon | 208/390 |
| 2011/0226672 A1 | 9/2011 | Peuker | 208/390 |

OTHER PUBLICATIONS

Peuker, U.S., "Abtrennung von Organischen Lösemitteln aus Filterkuchen mit Dampf (Separation of Organic Solvents from Filter Cakes with Steam)", F&S Filtrieren und Separieren, vol. 17, No. 5; pp. 230-236, 2003.

Peuker, U.A., "Applying Mechanical-Thermal Filtration Processes for Purification, e.g. Solvent Removal", Proc. Filtech Europe, Düsseldor, DE; 9 pages, Oct. 2003.

Peuker, U.A., et al., "Steam Pressure Filtration: Mechanical-Thermal Dewatering Process", *Drying Technology*, vol. 19, No. 5; pp. 807-848, 2001.

* cited by examiner

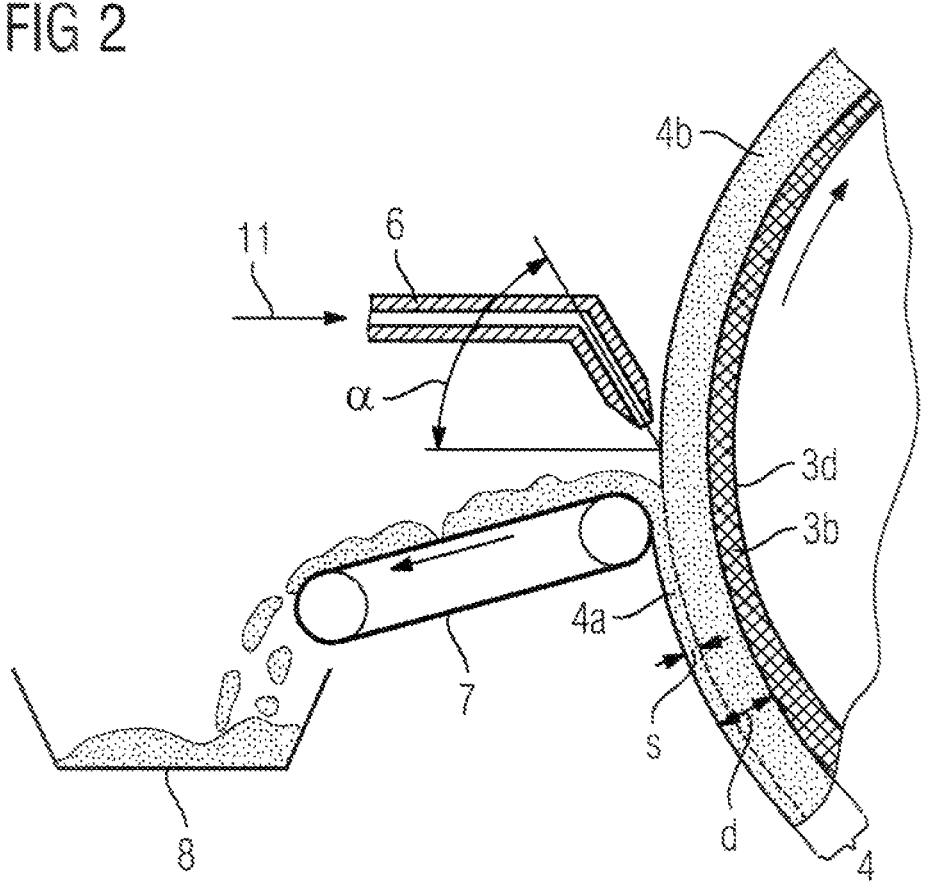

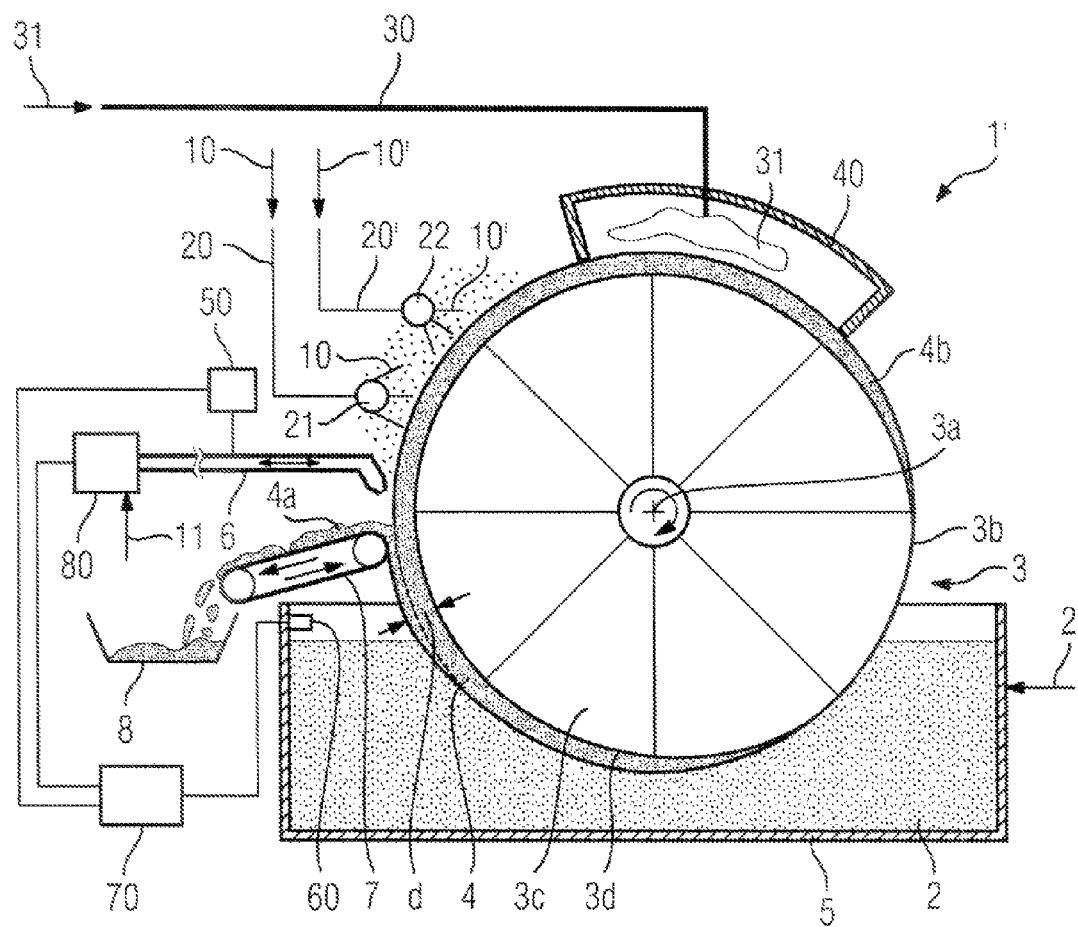

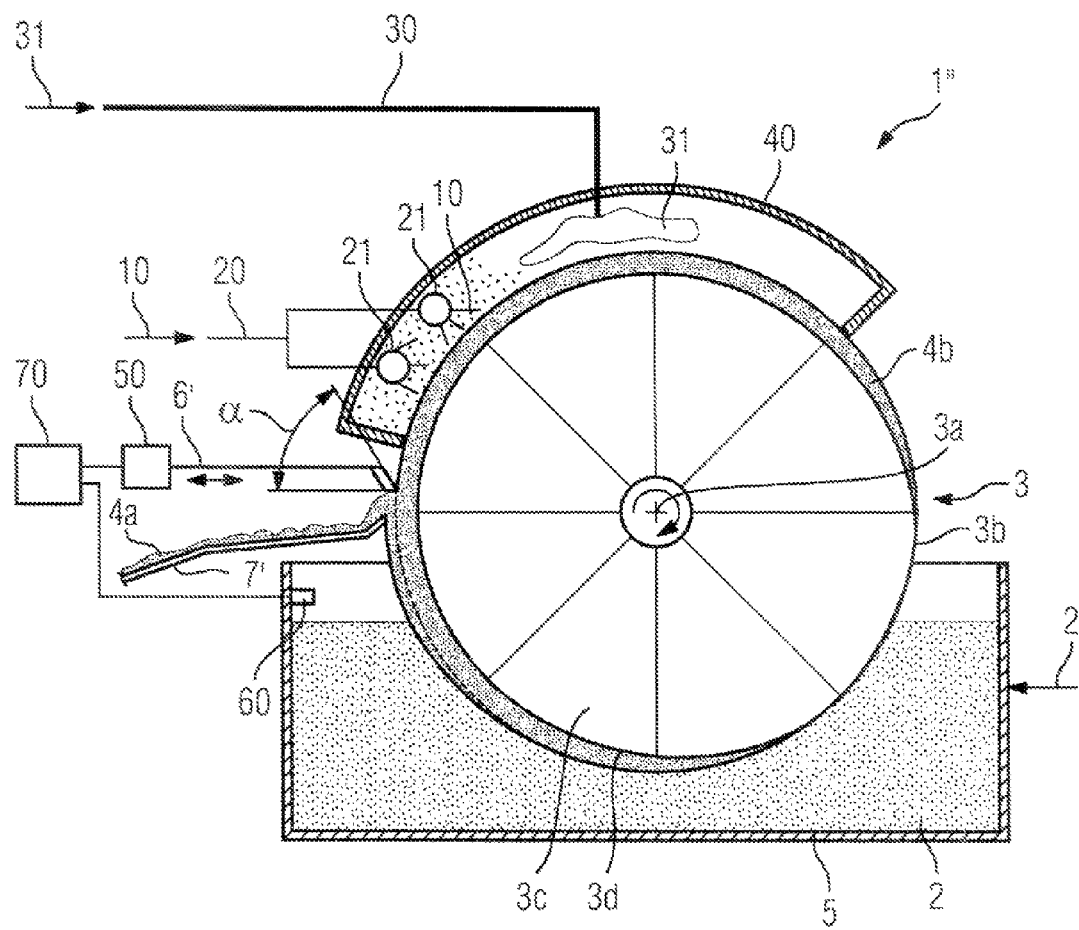

FILTER DEVICE, METHOD FOR ITS OPERATION AND USE THEREOF

CROSS-REFERENCE TO RELATED APPLICATIONS

This application claims priority to EP Patent Application No. 11165669 filed Nov. 5, 2011. The contents of which is incorporated herein by reference in its entirety.

TECHNICAL FIELD

The disclosure relates to a filter device for filtering a suspension, comprising at least one filter for continuous creation of a filter cake containing particles from the suspension, with the at least one filter being configured to supply the filter cakes one after the other to at least one dispensing device for applying at least one first wash liquid to the filter cakes and to at least one steaming unit for steaming the filter cake by means of steam. The disclosure further relates to a method for operating the filter device and to use of the filter device for extraction of hydrocarbons from oil sand.

BACKGROUND

An oil sand usually consists of a mixture of clay substance, silicates, water and hydrocarbons. The oil phase contained up to 18% in oil sands consisting of various hydrocarbons has a very different composition, often specific to the extraction area, wherein bitumen, crude oil and asphalt can be contained therein. The processing of oil sand is carried out with the aim of separating the stone or sand fraction comprising clay substance and silicates from the actual valuable material, i.e. the oil phase comprising the hydrocarbons.

Oil sands are frequently extracted in open cast workings. For extraction from deeper layers of the earth preprocessing is often undertaken, in which the steam is introduced into the deposits, the hydrocarbons are liquefied and collected at drilling rigs and bought to the surface.

U.S. Pat. No. 4,240,897 describes a method for extraction of bitumen from oil sand by means of hot water.

DE 10 2007 039 453 A1 describes a method for obtaining bitumen from oil sand-water mixtures by means of flotation.

According to the CLARK-ROWE process, oil sand is mixed with sodium hydroxide and hot water and the oil phase is mobilized thereby. A water-oil phase separation is primarily undertaken by flotation. The remaining stone or sand component still contains up to 20% of the oil phase after the extraction, which in part is bound adsorptively to the surface of the finest particles. This leads to a steric stabilization of these particles in the waste water flow of the process, making separation of these particles very much more difficult. Furthermore a significant amount of clay substance is so greatly hydrophobized by an adsorptive agglomeration of the oil phase so that this gets into the product during a flotation, i.e. the separated oil phase. The clay substance represents a quality reducing contamination there, which can only be separated again with difficulty. Depending on oil sand composition, to obtain a barrel of oil phase around two to five times the amount of non-recyclable fresh water is needed. The water is stored temporarily or finally in collection basins with the separated stone or sand fraction.

U.S. Pat. No. 4,968,412 describes a two-stage method for removal of bitumen from oil sand, in which in a first step organic solvents are supplied and the clay substance is separated. In a second step the processed oil sand is washed with water while adding surfactants.

U.S. Pat. No. 3,542,666 describes a method for extraction of hydrocarbons from oil sand, in which organic solvents in combination with a small amount of water are mixed in specific quantity ratios with the oil sand to a suspension and the pH value of the suspension is set to at least 5 before there is filtration of the suspension.

The unpublished European patent application with the file reference EP 10156735 describes a method for extraction of hydrocarbons from oil sand. It has been shown that a use of purely organic extraction means leads to the finest components which predominantly consist of clay substance agglomerating in the oil sand and the agglomerates additionally exhibiting a hydrophobic behavior. This makes possible a separation of the clay substance with the stone and sand fraction by means of a mechanical solid-liquid filtration. In this process the oil sand is suspended with organic solvents and filtered by means of a continuous filter, especially a drum filter. The filter cake formed is washed in a filter unit by means of at least one first wash liquid and subsequently steamed with a steam formed from a second wash liquid, wherein residues still present in the filter cake of the first wash liquid(s), including possible hydrocarbon residues, are driven out of the oil sand. The filter cake is cleaned and largely dehumidified in this case. In this case the application of the first wash liquid(s) to the filter cake can be undertaken by means of a dispensing device, which e.g. is realized by nozzles.

The driving out of the residual amount of first wash liquid from the filter cake is also referred to in the literature as steam pressure filtration.

The basics of steam pressure filtration are known and are described for example in the following publications:

"Steam Pressure Filtration: Mechanical-Thermal Dewatering Process", U. A. Peuker, W. Stahl, Drying Technology, 19(5), pages 807-848 (2001);

"Applying mechanical-thermal filtration processes for purification, e.g. solvent removal", U. A. Peuker, Proc. Filtech Europe, 12.-23. Oct. 2003, Düsseldorf, Germany;

"Abtrennung von organischen Lösemitteln aus Filterkuchen mit Dampf" (Separation of organic solvents from filter cakes with steam), U. A. Peuker, F & S Filtrieren and Separieren, Volume (2003), No. 5, pages 230 to 236;

"Steam Pressure Filtration for the treatment of limey soils contaminated with aliphatic hydrocarbons", by M. Bottlinger, H. B. Bradl, A. Krupp, U. Peuker, $2^{nd}$ Int. Containment & Remediation Technology Conference, 10-13 Jun. 2001, Orlando, Fla., USA;

The filter cake, comprising the stone or sand fraction of the oil sand, is freed from first wash liquid when the steam is pushed through it and at the same time a quantity of hydrocarbons or oil phase dissolved therein is driven out. This increases the yields of hydrocarbons or improves the separation degree to around 95 to 98%, which characterizes the separation success.

U.S. Pat. No. 3,969,247 and EP 0 326 939 A2 disclose a filtration process using a drum filter in which the water vapor is pushed through the filter cake produced.

It has been shown that with some suspensions to be filtered a filter cake is formed with a surface layer which differs in its composition from the rest of the filter cake and makes washing and steaming of the filter cake more difficult. In the case of suspensions of oil sand and organic solvents this situation occurs for example when there is a high bitumen content in the suspension. It forms a surface layer thickening the filter cake towards the top containing a high proportion of asphalt clay substance agglomerates, which make it difficult or impossible for the wash liquid to flow through the filter cake.

On occurrence of such compositions of the suspension to be filtered the yield of hydrocarbons from the oil sand is thus markedly reduced.

Filter devices are already known from U.S. Pat. No. 1,963,616, U.S. Pat. No. 4,521,314 and German publication No. 2106131 in which the surface of the filter cake formed is peeled off and the peeled-off material is fed back into the suspension and dissolved again therein.

SUMMARY

In one embodiment, a filter device for filtering a suspension comprises at least one filter for continuous creation of a filter cake containing particles from the suspension, wherein the at least one filter is configured to convey the filter cakes one after the other to at least one dispensing device for applying at least one first wash liquid to the filter cakes and at least one steaming unit for steaming the filter cake by means of steam, wherein furthermore at least one removal device for removal of a surface layer of the filter cake facing away from the filter is present, wherein the filter device is configured to convey the filter cakes one after another to the at least one removal device, the at least one dispensing device and the at least one steaming device, and wherein at least one transport device for transporting away the removed surface layer of the filter cake from the filter device is present.

In a further embodiment, at least one removal device has at least one jet nozzle for emitting gas in the direction of the surface layer of the filter cake. In a further embodiment, the at least one removal device comprises at least one mechanical removal element. In a further embodiment, a position of the at least one jet nozzle and/or of the at least one mechanical removal element is able to be modified relative to the filter. In a further embodiment, at least one measuring device for detecting a thickness d and/or color of the filter cake is present and wherein the at least one removal device is configured to remove the surface layer in a layer thickness s which is selected as a function of the thickness d and/or color of the filter cake. In a further embodiment, the at least one removal device is configured to remove the surface layer in a layer thickness s which is then in a range of up to 10% of the thickness d of the filter cake. In a further embodiment, the at least one filter is a rotary filter. In a further embodiment, the at least one filter is a drum filter or a disk filter or a pan filter or a band filter.

In another embodiment, a method is provided for operating any of the filter devices discussed above, wherein a surface layer of the filter cake facing away from the filter is removed by means of the at least one removal device and transported away by means of the at least one transport device.

In a further embodiment, a layer thickness "s" of the surface layer to be removed is set as a function of the thickness d and/or color of the filter cake. In a further embodiment, the surface layer is removed in a layer thickness s which lies in a range of up to 10% of the thickness d of the filter cake. In a further embodiment, the surface layer is separated by means of a gas flow and/or by the mechanical removal element from the filter cake.

In another embodiment, any of the filter devices discussed above is used for extraction of hydrocarbons from oil sand, wherein the suspension to be filtered is formed from the oil sand and at least one organic solution.

BRIEF DESCRIPTION OF THE DRAWINGS

Example embodiments will be explained in more detail below with reference to figures, in which:

FIG. 2 illustrates an enlarged section from FIG. 1 in the area of a removal device of the first filter device, according to one embodiment;

FIG. 3 illustrates an example second filter device with a continuous filter in the form of a drum in a cross-sectional diagram, according to one embodiment; and FIG. 4 illustrates an example third filter device with a continuous filter in the form of a drum in a cross-sectional diagram, according to one embodiment.

DETAILED DESCRIPTION

Figure 1:
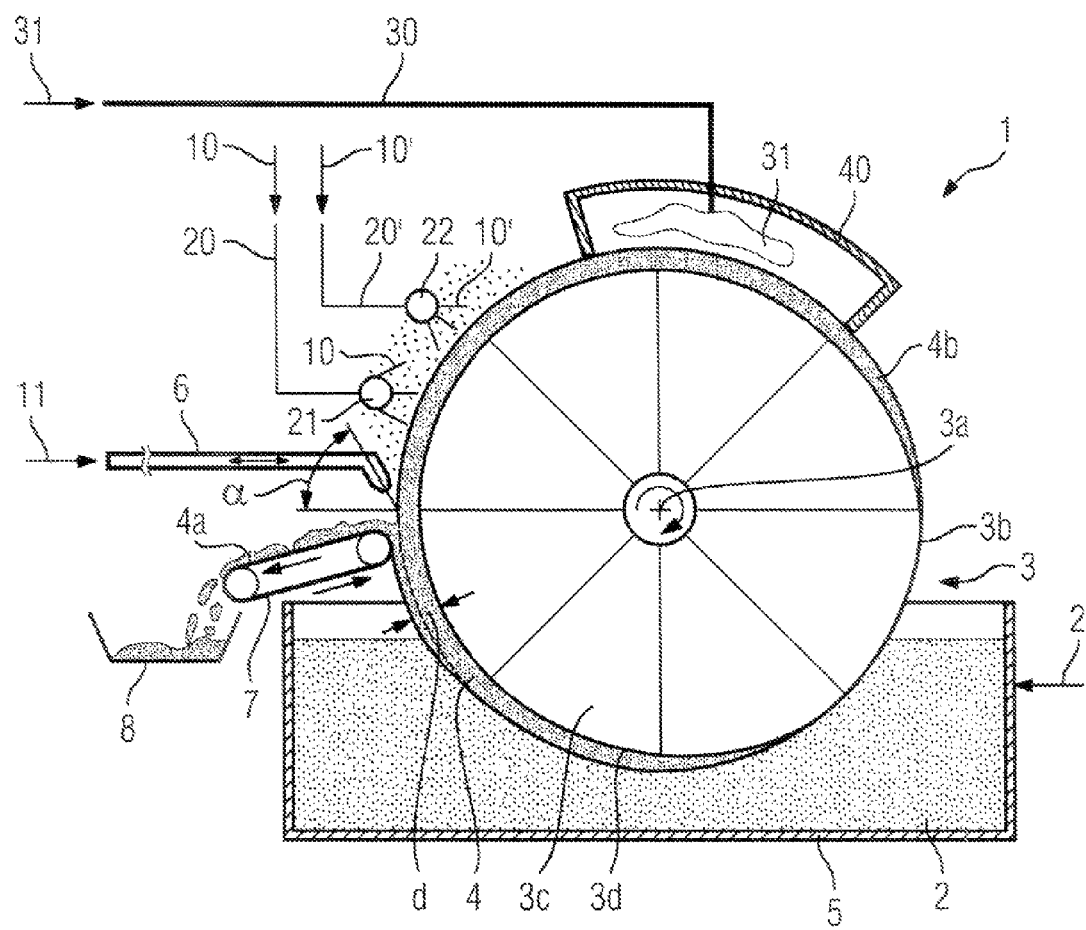
FIG. 1 illustrates an example first filter device with a continuous filter in the form of a drum in a cross-sectional diagram, according to one embodiment.

Some embodiments provide a filter device for filtering a suspension, which may ensure desired or even optimum washing of the filter cake with wash liquid at any time. Other embodiments provide a method of operation and a use of such a filter device.

For example, some embodiments provide a filter device for filtering a suspension, comprising at least one filter for continuous creation of a filter cake containing particles from the suspension, wherein the at least one filter is configured to supply the filter cakes one after the other to at least one dispensing device for applying at least a first wash liquid to the filter cake and to at least one steaming unit for steaming the filter cake by means of steam, by at least one removal device also being provided for removing a surface layer of the filter cake facing away from the filter, wherein the filter device is configured to supply the filter cakes in turn to the at least one scraper device, the at least one dispensing device and the at least one steaming unit and wherein at least one transport device is present for transporting away the removed surface layer of the filter cake from the filter device.

Other embodiments provide a method for operating a filter device by a surface layer of the filter cake facing away from the filter being removed by means of the at least one scraper device and being transported away by means of the at least one transport device.

The peeling off of the surface layer from the rest of the filter cake or the remaining filter cake implemented by the filter device and the method even before a wash step is carried out on the filter cake by means of the at least one dispensing device makes it possible to carry out the washing of the filter cake even with unfavorable or widely differing composition of the suspension while the high throughput remains the same. This may ensure that the liquid is able to flow through the filter cake during the wash step. The at least one transport device to transport away the removed surface layer of the filter cake guarantees that the asphalt clay substance agglomerates accumulated in the peeled-off surface layer can be separated from the process and no longer get back into the suspension to be filtered. A continuous rise of the asphalt clay substance agglomerates disrupting the filter process in the filter device may thus be reliably prevented and the efficiency of the filter device maximized.

In some embodiments, the use of organic solvents as first wash liquid(s) and of water as the second wash liquid to form steam may be employed. Details of this can be found in EP 10156735 cited above.

The dispensing device may comprise a number of nozzles for applying the first wash liquid(s) to the filter cake, wherein the nozzles can be disposed in a chamber or a hood. The first wash liquid applied to the filter cake forms a film which may preferably flow against the filter movement. Provided the dispensing device is integrated into a chamber or hood, the at least one removal device can be attached to this chamber or hood or can be supported by it.

The filter device is configured to supply the filter cakes one after another to the at least one removal device and the at least one dispensing device and the at least one steaming unit. Thus the surface layer is separated from the filter cake even before the application of the first wash liquid to the filter cake.

It has proven useful for the at least one removal device to have at least one jet nozzle for emitting gas in the direction of the surface layer of the filter cake. In particular compressed air is blown in the direction of the filter cake by the at least one jet nozzle, which causes an explicit removal of the surface layer.

As an alternative or in combination with this the at least one removal device can comprise at least one mechanical removal element, for example in the form of a cutter wire, peeling knife, scraper or the like, which separates the surface layer from the rest of the filter cake, especially cuts or scrapes it off.

In such cases it may be advantageous for a position of the at least one jet nozzle and/or the at least one mechanical removal element to be able to be changed relative to the filter. This enables a layer thickness s of the surface layer to be removed to be influenced directly. In particular a setting of the jet nozzle(s) and/or of the removal elements at an angle α of around 70 or 90° to the horizontal may be preferred.

The filter device may include at least one measuring device for detecting a thickness d and/or color of the filter cake, wherein the at least one removal device is configured to remove the surface layer in a layer thickness s which is selected as a function of the thickness d and/or color of the filter cake. As an alternative or in combination, a composition of the suspension to be filtered can also be detected by means of a measurement device and the surface layer can be removed in a layer thickness s which is/will be selected as a function of the composition of the suspension.

In some embodiments, the jet nozzles and/or removal elements are positioned automatically as a function of a thickness d of the filter cake formed, a color of the surface layer of the filter cake, a composition of the suspension or as a function of parameters which are in direct conjunction with the composition of the surface layer. If there is an increase in the thickness d of the filter cake it is to be assumed that a smaller proportion of asphalt clay substance agglomerates is present and therefore the layer thickness s of the surface layer to be removed can be reduced. Determining the color of the surface layer of the filter cake frequently makes deductions possible about its composition and consequently about its permeability for wash liquid(s).

To achieve automatic adjustment of jet nozzles and/or removal elements, these are moved by a drive unit, e.g., an actuating motor. The drive unit is controlled or regulated by an open-loop and/or closed-loop control device to which the at least one measurement device transfers measurement data.

Control or regulation of the amount of gas which is output to the filter cake can also be undertaken. For this purpose a valve or fan is controlled or regulated by means of an open-loop or closed-loop control device, wherein an amount of gas fed to the jet nozzles is varied. The higher the gas pressure the higher is the gas speed and the removal power of the gas flow in the direction of the surface of the filter cake, so that the layer thickness s of the surface layer to be removed can likewise be influenced in this way.

Furthermore the at least one transport device for transporting the removed surface layer of the filter cake away from the filter and the suspension to be filtered may be implemented by a chute, an ejector duct or the like. As an alternative or in combination a driven conveyor can also be used as the transport device, such as a conveyor belt etc.

The at least one removal device may be configured to remove the surface layer in a layer thickness s in a range of up to 10% of the thickness d of the filter cake. The surface layer may be removed in a layer thickness s in a range of between 2 and 5% of the thickness d of the filter cake. This achieves a reliable peeling away of the compressed surface layer.

In an example embodiment of the filter device the at least one filter is a rotary filter. The at least one filter may be a drum filter. However the filter can also be embodied as a disk filter, pan filter or band filter.

In some embodiments of the method, the suspension to be filtered may be formed from oil sand and at least one organic solvent.

Embodiments of the filter device disclosed herein may be used, e.g., for extraction of hydrocarbons from oil sand, wherein the suspension to be filtered is formed from the oil sand and at least one organic solvent.

For further details thereof the reader is referred to EP 10156735 cited above.

The thickness of the filter cake formed may lie in the range of 2 to 100 mm, e.g., in the range of 5 to 25 mm. A filter cake formed from residues of the oil sand, after being steamed with water vapor, is free of organic solvents and volatile hydrocarbons and can be returned directly, e.g. in the area of the workings, into the ground. Separate storage of the separated stone or sand fraction is dispensed with. It can still contain just a small proportion of heavily-volatile hydrocarbons.

The removed surface layer 4a, in the event of a filtration of oil sand, has a large amount of asphalt clay substance agglomerates, which may be re-suspended by means of at least one organic liquid and fed to a decanter. The fixed components are separated from the organic components or hydrocarbons still contained therein, with the solid components if necessary subsequently able to be returned to the ground.

A mixture of at least two different organic solvents may be used as the organic solvent which is suspended with the oil sand. For example, mixtures comprising at least two organic solvents from the group toluol, benzol, heptane or hexane may be used. But other organic solvents are also able to be used here. A pure organic solvent, e.g., in the form of toluol or heptane, can alternatively be used together with the oil sand to form the suspension to be filtered. It is likewise possible to use technical solvents such as paraffin, naptha, benzine or kerosene with a variable chemical composition depending on manufacturing.

The chemical composition of the organic solvents used and of the first wash liquid(s) may be selected in such cases as a function of a molecule content of the oil sand containing ≥10 carbon atoms, e.g., voluminous molecules from the cyclo alkane and/or naptha acids and/or asphaltene group. For this purpose the content of oil sand may be matched to such molecules.

For a purely aliphatic extraction a solubility of these types of voluminous molecules has proved to be a problem in a number of organic solvents. Thus for example for use of paraffins as extraction means the cyclo alkanes and naptha acids occur as gel-type solid material structures. This reduces the yields, encourages the formation of a surface layer thickening the filter cake and worsens the processability of the oil phase.

FIG. 1 shows a schematic of a first example filter device 1 for filtering a suspension 2 in a cross-sectional diagram. The filter device 1 comprises a container 5 to accommodate the suspension 2 which is continuously supplied to the container 5 as well as a filter 3 in the form of a continuous rotary filter.

The rotary filter here is a drum 3d spanned by filter material 3b, i.e. a drum filter, with a number of filter cells 3c separated from one another. The drum filter dips into the suspension 2 and is rotated in the direction of the arrow around an axis of rotation 3a (see arrow), wherein a pressure is obtained at least in some of the filter cells 3c which is lower than that outside the filter material 3b. Through this liquid is sucked out of the suspension 2 through the filter material 3b into the respective filter cell 3c and a filter cake 4 forms on the filter material 3b, the thickness d of which increases the longer the filter material 3b remains in the suspension 2.

As an alternative to such vacuum filtration a hyperbaric filtration can be carried out, with the space outside the drum filter being at a higher level of pressure and liquid of the suspension being pushed through the filter material. In such cases a filter cake also forms on the filter material.

The filter cake 4 comprises filterable particles of the suspension 2. If a suspension 2 is used, which is formed for example from oil sand and organic solvents, the filter cake 4 contains clay substance agglomerates as well as other particles of the stone and sand fraction of the oil sand. An extract phase comprising hydrocarbons from the oil sand and organic solvents is separated and is removed from the filter cells 3c in the area of the axis of rotation 3a of the drum filter.

As a result of the continuous rotation of the drum filter around the axis of rotation 3a the filter cake 4 formed emerges on one side from the suspension 2. The filter cake 4 formed, depending on the composition of the suspension 2, has a more or less thick surface layer 4a which in its composition differs from the rest of the filter cake 4b. In this case the surface layer 4a is frequently compressed or less porous and more difficult for wash liquids to penetrate than the rest of the filter cake 4b.

Here the filter cake 4, after its exit from the suspension 2, first arrives in the area of a removal device 6. The removal device 6 comprises a jet nozzle with a gas outlet slot which is disposed in parallel to the axis of rotation 3a of the filter 3 in the area of the filter cake 4. In this case the jet nozzle is adjustable in respect of its distance and gas outflow angles to the filter cake 4. Here the jet nozzle is aligned at an angle α of 75° to the horizontal in relation to the filter 3. A gas 11, especially an inert gas or air, is emitted by means of the removal device 6 onto the surface of the filter cake 4 facing away from the filter material 3b and the surface layer 4a is dissolved over the entire width of the drum 3d. For further details see also the enlarged section from FIG. 1 in FIG. 2 in the area of the removal device 6.

Depending on the removal angle of the gas 11, its distance from the filter cake 4 and the amount of gas used, more or less material is removed from the filter cake 4 in such cases. The removed material or the dissolved surface layer 4a is transported away from the filter 3 via a transport device 7 in the form of a driven conveyor belt and is transferred into a collecting basin 8 where it can be further treated in any given way or temporarily stored.

In the alternative hyperbaric filtration not shown here specific removal devices are required for transporting away the removed material or the dissolved surface layer 4a in order to avoid a drop in pressure in the space outside the drum filter. Typical removal devices which have proven useful here are for example worm removal drives, vaned wheels or 2-flap systems which flush the removed material or the dissolved surface layer 4a out of the space at an increased pressure.

The rest of the filter cake 4b left on the filter 3 is subsequently fed as a result of the continuous rotation of the drum 3d to a dispensing device 20, 20' comprising nozzles 21, 22 for applying at least one first wash liquid 10, 10' to the rest of the filter cake 4b.

Thereafter the rest of the filter cake 4b, because of the rotary movement of the drum 3d, is conducted to a steaming unit 30, for steaming the rest of the filter cake 4b by means of steam 31. The steaming unit 30 is embodied here in the form of a pipe for supplying steam and is integrated into a hood 40.

By means of the dispensing device 20, 20' an organic solvent, for example comprising a mixture of toluol and heptane, is applied here to the rest of the filter cake 4b on a side facing away from the filter material 3b via the nozzles 21, 22 as a first wash liquid 10, 10'. The first wash liquid 10 expels a residual quantity of organic solvent with which the suspension 2 was formed, including hydrocarbons from the oil sand dissolved therein, from the open pore area of the rest of the filter cake 4b. A number of different first wash liquids 10, 10' may be applied by the dispensing device 20, 20' one after the other to the rest of the filter cake 4b. After the surface layer 4a which may be hindering the washing process has already been removed, the remainder of the filter cake 4b is washed quickly in an uncomplicated manner and with high yield.

The remainder of the filter cake 4b is first washed for example on its side facing away from the filter material 3b by means of the nozzles 21 with a first wash liquid 10, formed from a mixture of toluol and heptane, and is subsequently washed by means of the nozzles 22 with a further first wash liquid 10' comprising pure hexane or heptane.

The hood 40 surrounds a part of the drum filter. The steam 31, here in the form of water vapor, is introduced via the remainder of the filter cake 4b into the hood 40 and is sucked out through the latter. In such cases a residual quantity of first wash liquid still remaining in the remainder of the filter cake 4b comprising residues of hydrocarbons originating from the oil sand is removed. The steam 31 is pushed through the remainder of the filter cake 4b and the remainder of the filter cake 4b is thus dehumidified mechanically and thermally.

The quantities of extract phase penetrating into the filter chambers 3c in each case are collected in the area of the axis of rotation 3a and are taken away from the first filter apparatus 1 by means of a unit not shown in detail here, for example in the form of a pipe. A largely dehumidified and solvent-free remainder of the filter cake 4b remains as filter residue, which can be removed from the filter material 3b by compressed air for example and/or by a mechanical wiper and e.g. returned to the ground at the location of the extraction workings of the oil sand. The removal of the largely dehumidified and solvent-free remainder of the filter cake 4b from the filter material 3b is however not shown in detail here for improved clarity.

The extract phase obtained by the first filter device 1 is for example conveyed to a processing system, which separates the hydrocarbons extracted from the oil sand and separates the organic solvent used in the most environmentally friendly way possible. The environmentally reclaimed solvents can be used again. This is not however shown in detail here for reasons of clarity. For more details the reader is referred to the content of EP 10156735.

FIG. 3 shows a second example filter device 1' similar to that shown in FIG. 1, in which a control or regulation device 70 is present. The same reference characters as in FIG. 1 refer to the same elements. A measurement device 60 for detecting the thickness d of the filter cake 4 is also present here, which transfers the current measured value for the thickness d to an open-loop and/or closed-loop control unit 70. This calculates from the measured value for the thickness d of the filter cake 4 a signal for setting the distance between filter cake 4 and removal device 6 which is transferred to a drive unit 50. The drive unit 50 causes the distance to be adapted to the current thickness d of the filter cake 4. The position of the removal device 6 is set online as a function of the thickness d of the filter cake and will thus be fully optimized. The measurement device 60 for detecting the thickness d of the filter cake 4 can involve an optical measurement device or a mechanical measurement device. The control or regulation device 70 is also configured here to control a fan 80 which determines the amount of gas 11 supplied to the removal device 6 and to predetermine the desired gas supply amount as a function of the measured thickness d of the filter cake 4.

Instead of or in combination with the detection of the thickness d of the filter cake 4, the color of the surface layer 4a of the filter cake 4 and/or the composition of the suspension 2 can be detected by means of a measurement device and the layer thickness s of the surface layer 4a to be removed can be set as a function of these measured values.

FIG. 4 shows a third example filter device 1" similar to that of FIG. 1. The same reference characters as in FIG. 1 refer to the same elements. The dispensing device 20 is disposed integrated into the hood 40 here. A cutting knife is present here as a removal device 6', the blade of which is arranged in parallel to the axis of rotation 3a and which removes the surface layer 4a from the filter cake 4. In this case the position of the cutting knife is able to be adjusted via a drive unit 50 as a function of the thickness d of the filter cake 4. A chute is present as a transport device 7' via which the separated material is transported away.

Instead of or in combination with detection of the thickness d or the filter cake 4, the color of the surface layer 4a of the filter cake 4 and/or the composition of the suspension 2 can also be determined by means of a measuring device and the layer thickness s of the surface layer 4a to be removed can be set as a function of these measured values.

FIGS. 1 to 4 merely show example embodiments of filter devices and methods for their operation. A person skilled in the art is readily able for example, instead of the drum filter shown here, to use a band filter, disk filter or other rotary filter. Furthermore removal devices in the form of cutting wires, scrapers or the like can be used, as well as other measurement devices or hood constructions. Hyperbaric filtration can also be used instead of vacuum filtration.

What is claimed is:

1. A filter device for filtering a suspension comprising:
   at least one filter for continuous creation of a filter cake including particles from the suspension;
   at least one dispensing device configured to apply at least one first wash liquid to the filter cakes;
   at least one steaming unit configured to steam the filter cake using steam;
   at least one removal device upstream of the at least one dispensing device and the at least one steaming unit and comprising at least one jet nozzle configured to deliver a gas to the filter cake to remove a surface layer of the filter cake facing away from the at least one filter, wherein the surface layer comprises only a partial thickness of the filter cake such that a remaining thickness of the filter cake remains on the filter after removal of the surface layer and advances to the at least one dispensing device and the at least one steaming unit;
   wherein the filter device is configured to convey the filter cake to the at least one removal device, the at least one dispensing device and the at least one steaming device; and
   at least one transport device configured to transport the removed surface layer of the filter cake away from the filter device.

2. The filter device of claim 1, wherein:
   the at least one removal device further comprises a mechanical removal element; and
   a position of at least one of the jet nozzle and the mechanical removal element is configured for adjustment relative to the filter.

3. The filter device of claim 1, comprising at least one measuring device for detecting at least one of a thickness and a color of the filter cake;
   wherein the at least one removal device is configured to remove the surface layer in a layer thickness which is selected as a function of at least one of the detected thickness and color of the filter cake.

4. The filter device of claim 1, wherein the at least one removal device is configured to remove the surface layer in a layer thickness which is up to 10% of the a thickness of the filter cake approaching the at least one removal device.

5. The filter device of claim 1, wherein the at least one filter is a rotary filter.

6. The filter device of claim 1, wherein the at least one filter is a drum filter, a disk filter, a pan filter, or a band filter.

7. The filter device of claim 1, wherein the least one jet nozzle is aligned relative to the filter cake to deliver gas in a direction having a vector component that opposes a movement direction of the filter cake.

8. The filter device of claim 1, comprising:
   a detection device configured to detect a thickness of the filter cake; and
   a controller configured to control the gas delivery through the at least one jet nozzle based at least on the detected thickness of the filter cake.

9. The filter device of claim 1, comprising:
   a detection device configured to detect a color of the filter cake; and
   a controller configured to control the gas delivery through the at least one jet nozzle based at least on the detected color of the filter cake.

10. A method for operating a filter device to filter a suspension, comprising:
    forming a continuous filter cake on a filter, the filter cake including particles from the suspension;
    applying at least one first wash liquid to the filter cakes via at least one dispensing device;
    steaming the filter cake via at least one steaming device;
    delivering gas through at least one jet nozzle of at least one removal device to remove a surface layer of the filter cake facing away from the at least one filter, wherein the surface layer comprises only a partial thickness of the filter cake such that a remaining thickness of the filter cake remains on the filter after removal of the surface layer;
    conveying the filter cake to the at least one removal device and subsequently to the at least one dispensing device and the at least one steaming device; and
    transporting the removed surface layer of the filter cake away from the filter device.

11. The method of claim 10, wherein a layer thickness of the surface layer to be removed is set as a function of at least one of a thickness and a color of the filter cake.

12. The method of claim 10, wherein the surface layer is removed in a layer thickness of up to 10% of the a thickness of the filter cake approaching the at least one removal device.

13. The method of claim 10, wherein the surface layer is separated from the filter cake by the gas delivery through the at least one jet nozzle and by a mechanical removal element.

14. The method of claim 10, wherein the least one jet nozzle is configured to emit gas in a direction having a vector component that opposes a movement direction of the filter cake.

15. The method of claim 10, further comprising:
detecting a thickness of the filter cake; and
controlling the gas delivery through the at least one jet nozzle based at least on the detected thickness of the filter cake.

16. The method of claim 10, further comprising:
detecting a color of the filter cake; and
controlling the gas delivery through the at least one jet nozzle based at least on the detected color of the filter cake.

* * * * *